(12) United States Patent
Vemuri et al.

(10) Patent No.: US 12,052,178 B2
(45) Date of Patent: *Jul. 30, 2024

(54) SYSTEMS AND METHODS FOR DETERMINING A POLICY THAT ALLOCATES TRAFFIC ASSOCIATED WITH A NETWORK PROTOCOL TYPE TO A NETWORK SLICE

(71) Applicant: Verizon Patent and Licensing Inc., Basking Ridge, NJ (US)

(72) Inventors: Bharadwaj Vemuri, Bear, DE (US); Ratul K. Guha, Warwick, PA (US); Kalyani Bogineni, Irving, TX (US); Deepa Jagannatha, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/650,539

(22) Filed: Feb. 10, 2022

(65) Prior Publication Data

US 2022/0278935 A1    Sep. 1, 2022

Related U.S. Application Data

(63) Continuation of application No. 17/102,764, filed on Nov. 24, 2020, now Pat. No. 11,265,254.

(51) Int. Cl.
*H04L 47/2475* (2022.01)
*H04L 47/2408* (2022.01)
(Continued)

(52) U.S. Cl.
CPC ...... *H04L 47/2475* (2013.01); *H04L 47/2408* (2013.01); *H04L 47/2433* (2013.01); *H04L 47/803* (2013.01); *H04W 28/0268* (2013.01)

(58) Field of Classification Search
CPC ............... H04L 47/803; H04L 47/2475; H04L 47/2441; H04L 47/2425; H04L 47/24;
(Continued)

(56) References Cited

U.S. PATENT DOCUMENTS 11,265,254 B1 * 3/2022 Vemuri ............... H04L 47/2433
2018/0220327 A1 * 8/2018 Karampatsis ..... H04W 28/0289
(Continued)

OTHER PUBLICATIONS

Alfoudi, et al., "An Efficient Resource Management Mechanism for Network Slicing in a LTE Network", in IEEE Access, vol. 7, pp. 89441-89457, 2019, doi: 10.1109/ACCESS.2019.2926446.
(Continued)

*Primary Examiner* — Omer S Mian

(57) ABSTRACT

A network device may receive, from a user equipment, a dataset identifying: applications utilized by the user equipment, network protocol types associated with the applications, and network addresses associated with the applications. The network device may segregate the dataset based on the network protocol types and to generate a segregated dataset. The network device may determine, based on the segregated dataset, a policy that causes particular application traffic associated with a particular network protocol type to be allocated to a particular network slice of the network. The network device may cause the policy to be provided to the user equipment to cause the user equipment to allocate the particular application traffic associated with the particular network protocol type to the particular network slice of the network.

20 Claims, 9 Drawing Sheets

(51) Int. Cl.
*H04L 47/2425* (2022.01)
*H04L 47/80* (2022.01)
*H04W 28/02* (2009.01)

(58) Field of Classification Search
CPC .... H04L 47/2408; H04W 4/70; H04W 16/12; H04W 16/02
See application file for complete search history.

(56) References Cited

U.S. PATENT DOCUMENTS

2020/0329008 A1* 10/2020 Dao ............... G06F 16/953
2020/0344679 A1   10/2020 Jin et al.
2020/0359271 A1   11/2020 Lee et al.
2020/0359439 A1* 11/2020 Qiao ............... H04W 76/15
2021/0076299 A1*  3/2021 Chunduri ......... H04W 36/08
2021/0152615 A1*  5/2021 Karampatsis ..... H04W 40/22
2022/0407783 A1* 12/2022 Cheng ............. H04L 41/16

OTHER PUBLICATIONS

Ramadhan, et al., "T-S3RA: Traffic-Aware Scheduling for Secure Slicing and Resource Allocation in SDN/NFV-Enabled 5G Networks", IEEE, 2021 (Year: 2021).

* cited by examiner

| Category | App Name | Package Name | Network Protocol Type | Port |
|---|---|---|---|---|
| Games | Game1 | com.game1.abc | UDP | 23069 |
| | Game2 | com.game2.xyz | TCP | Random |
| | Game3 | com.game3.game | TCP | Random |
| | Game4 | com.game4.puzzle | TCP | 3597 |
| Video | Video1 | com.video1.show | UDP | 44389 |
| | Video2 | com.video2.stream | UDP | 44328 |
| | Video3 | com.video3.tv | UDP | 17903 |
| | Video4 | com.video4.watch | UDP | 443 |
| | Video5 | com.video5.stream | TCP | Random |
| | Video6 | com.video6.tv | TCP | Random |
| Social | Social1 | com.social1.app | TCP | 443 |
| | Social2 | com.social2.tw | TCP | 443 |
| | Social3 | com.social3 | TCP | 443 |
| AR/VR | XYZ | com.arvr.pkg | UDP | 27476 |
| Education | Education1 | com.education1.pkg | TCP | Random |
| | Education2 | com.education2.train | TCP | Random |
| Comms | Comm1 | com.ss.comm1 | UDP | |
| | Comm2 | com.what.comm2 | UDP | |
| | Comm3 | com.ms.comm3 | UDP | |
| | Comm4 | com.comm4.gram | UDP | Random |

FIG. 1B

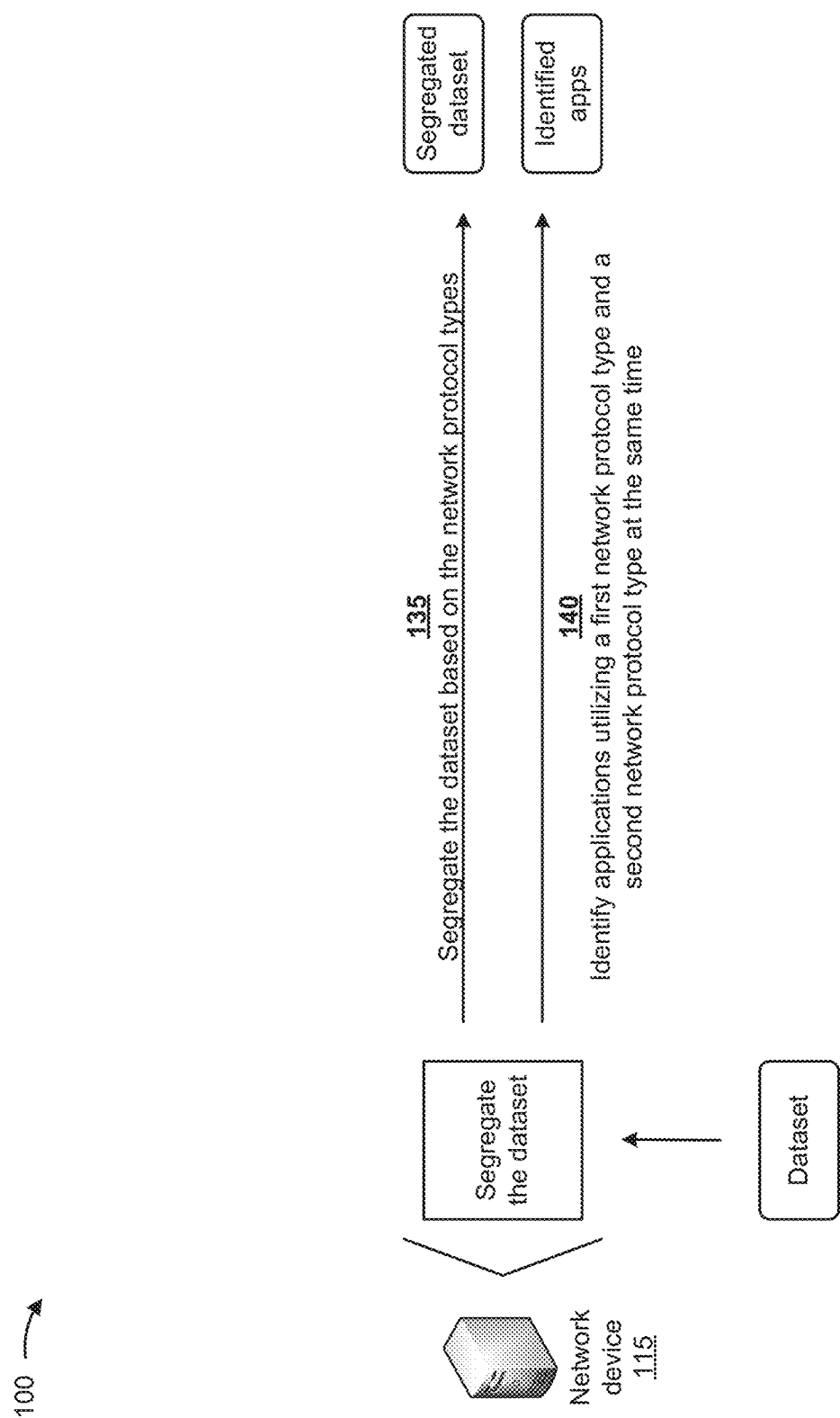

SYSTEMS AND METHODS FOR DETERMINING A POLICY THAT ALLOCATES TRAFFIC ASSOCIATED WITH A NETWORK PROTOCOL TYPE TO A NETWORK SLICE

RELATED APPLICATION

This application is a continuation of U.S. patent application Ser. No. 17/102,764, entitled "SYSTEMS AND METHODS FOR DETERMINING A POLICY THAT ALLOCATES TRAFFIC ASSOCIATED WITH A NETWORK PROTOCOL TYPE TO A NETWORK SLICE," filed Nov. 24, 2020, which is incorporated herein by reference in its entirety.

BACKGROUND

5G/New Radio (5G/NR) is a next generation global wireless standard. 5G/NR provides various enhancements to wireless communications, such as flexible bandwidth allocation, improved spectral efficiency, ultra-reliable low-latency communications (URLLC), beamforming, high-frequency communication (e.g., millimeter wave (mmWave)), and/or other enhancements.

BRIEF DESCRIPTION OF THE DRAWINGS

FIGS. 1A-1F are diagrams of one or more examples associated with determining a policy that allocates traffic associated with a network protocol type to a network slice.

DETAILED DESCRIPTION OF PREFERRED EMBODIMENTS

Figure 1A:
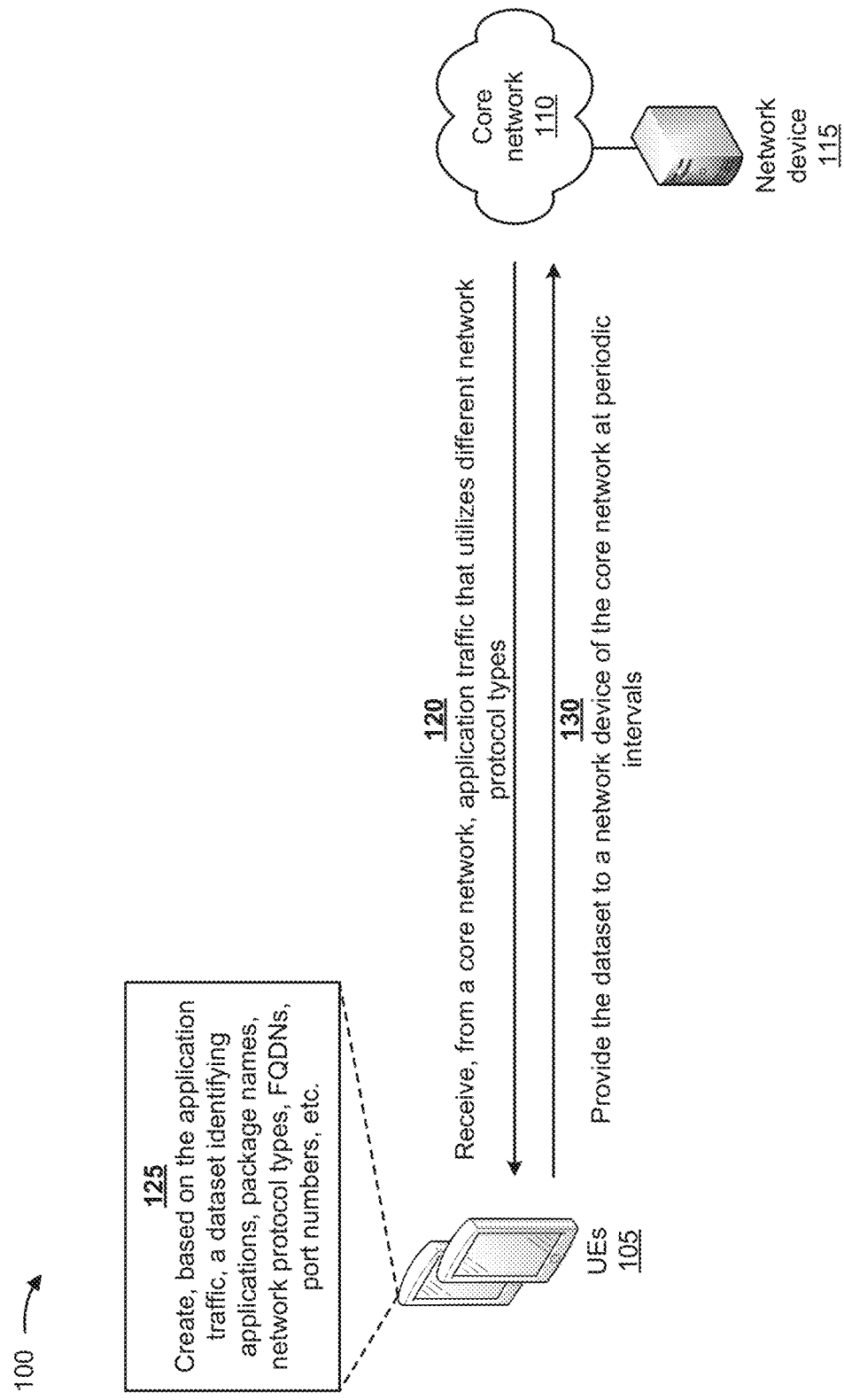

The following detailed description of example implementations refers to the accompanying drawings. The same reference numbers in different drawings may identify the same or similar elements.

In a wireless telecommunication system, such as a 5G wireless telecommunication network, network slicing allows for multiple virtual networks to run on a single physical network to support multiple services, applications, and/or entities (e.g., end users, customers, and/or organizations that provide a service to end users of the wireless telecommunication systems). For example, a network slice may be allocated for different types of network traffic (e.g., associated with the multiple services, the applications, and/or the entities).

Current implementations of network slicing do not account for different network protocol types associated with network traffic when a network slice is allocated for network traffic. For example, a single network slice may be allocated for first network traffic utilizing a first protocol type, for second network traffic utilizing a second protocol type, and for third network traffic utilizing a third protocol type. Allocating the network slice without taking into account the different network protocol types may prevent network traffic optimization in the wireless telecommunication system and may negatively affect network performance.

For example, while the network slice may be capable of handling the first network traffic and/or the second network traffic, the network slice may not have sufficient resource allocated to handle the third network traffic (e.g., due to one or more characteristics of the third network protocol type, such as a transmission rate associated with the third network protocol type). Accordingly, allocating the network slice in such a manner may cause packet loss, packet latency, packet jitter, and/or similar issues related to packet transmission (e.g., for the third network traffic utilizing the third network protocol type). As a result, allocating the network slice in such a manner wastes computing resources, network resources, and/or other resources that are used to address packet loss, packet latency, packet jitter, and/or similar issues related to packet transmission.

Some implementations described herein enable network traffic optimization by allocating an appropriate network slice for particular application traffic based on a particular network protocol type utilized by the particular application traffic. For example, a network device may receive, from a user equipment, a dataset identifying applications utilized by the user equipment, network protocol types associated with the applications, and network addresses associated with the applications. The network device may segregate the dataset based on the network protocol types and to generate a segregated dataset. The network device may determine, based on the segregated dataset, a policy that causes particular application traffic associated with a particular network protocol type to be allocated to a particular network slice of the network. The network device may cause the policy to be provided to the user equipment to cause the user equipment to allocate the particular application traffic associated with the particular network protocol type to the particular network slice of the network.

By determining the policy based on the dataset segregated based on the network protocol types and causing the policy to be provided to the user equipment, some implementations described herein may preserve computing resources, network resources, and/or other resources that would have otherwise been used to address packet loss, packet latency, packet jitter, and/or similar issues related to packet transmission (as described above).

FIGS. 1A-1F are diagrams of one or more examples 100 associated with determining a policy that allocates traffic associated with a network protocol type to a network slice. As shown in FIGS. 1A-1F, example(s) 100 may include a plurality of user equipment 105 (referred to individually as "UE 105" and collectively as "UEs 105"), a core network 110, and a network device 115. UEs 105, core network 110, and network device 115 are described in more detail in connection with FIG. 2.

As shown in FIG. 1A, and by reference number 120, UE 105 may receive, from a core network (e.g., from one or more devices in the core network), application traffic that utilizes different network protocol types. In some implementations, UE 105 may monitor application traffic of applications utilized by UE 105. For example, UE 105 may monitor the application traffic received from and/or transmitted to core network 110 based on UE 105 utilizing the applications. For instance, UE 105 may receive the application traffic from and/or transmit the application traffic to core network 110 based on downloading the applications, initiating the applications, transmitting requests using the applications, subscribing to services associated with the applications, and/or other similar utilization of the applications. In some instances, the applications may be one or more applications currently executing on UE 105.

In some implementations, the applications utilized by UE 105 may include one or more gaming applications, one or more video streaming applications, one or more social media applications, one or more augmented reality applications, one or more virtual reality applications, one or more educational applications, one or more communication applications, and/or other types of applications. In some implementations, the network protocol types (utilized by the application traffic of the applications) may include one or more of a transmission control protocol (TCP), a user datagram protocol (UDP), a quick UDP Internet connections protocol (QUIC), a hypertext transfer protocol (HTTP), a file transfer protocol (FTP), and/or another network protocol type.

In some implementations, UE 105 may be configured to monitor the application traffic for the purpose of traffic optimization (e.g., by allocating network slices based on network protocol types associated with the application traffic). For example, UE 105 may be preconfigured to monitor the application traffic for the purpose of traffic optimization, such as by storing information and/or instructions to monitor the application traffic. Alternatively, UE 105 may be configured to monitor the application traffic, for the purpose of traffic optimization, based on receiving an update to an operating system of UE 105. UE 105 may receive the update from a device associated with core network 110. The update may be issued by a network operator associated with the core network 110 and/or by a developer of the operating system.

In some implementations, UE 105 may monitor the application traffic based on a request from a device associated with the network operator, a device associated with from the developer of the operating system, a device associated with from network device 115, and/or a device associated with from a developer of one or more of the applications. For example, assume that a single network slice has been allocated for the application traffic (of the applications utilized by UE 105). Further, assume that a modem, a memory, or another component of UE 105 stores information identifying a UE route selection policy (URSP) that indicates the single network slice allocated for the application traffic. In this regard, all of the application traffic may be received from and transmitted to core network 110 using the single network slice, irrespective of the network protocol types utilized by the application traffic.

Assume that the single network slice is capable of handling a first portion of the application traffic associated with a first network protocol type (e.g., TCP) and/or associated with a second network protocol type (e.g., UDP). Further assume that the single network slice does not have sufficient resources allocated to handle another portion of the application traffic associated with a third network protocol type (e.g., QUIC).

Assume that, for the purpose of traffic optimization, the network operator desires network slices to be allocated based on network protocol types (e.g., because the single network slice does not have sufficient resources allocated to handle the portion of the application traffic associated with the third network protocol type). The device associated with the network operator may transmit the request to cause UE 105 to monitor the application traffic and collect information regarding the application traffic (hereinafter referred to as "application traffic information). As explained in more detail below, the application traffic information may be used to allocate network slices based on the network protocol types.

In some implementations, UE 105 may monitor the application traffic of the applications via one or more application program interface interfaces (APIs) (e.g., APIs related to application usage statistics and related to network usage statistics).

In some implementations, based on monitoring the application traffic, UE 105 may collect the application traffic information and store the application traffic information in a directory associated with the operating system. UE 105 may monitor the application traffic and/or collect the application traffic information on a periodic basis (e.g., every day, every week, every other week, and/or a similar periodic interval). The periodic basis may be determined by the device associated with the network operator and/or the device associated with the developer of the operating system.

Additionally, or alternatively, UE 105 may monitor the application traffic based on a triggering event such as a request received from another device (e.g., network device 115, the device associated with the network operator, and/or the device associated with the developer). The application traffic information may be stored in one or more files and/or documents stored by UE 105. In some instances, the application traffic may be monitored and the application traffic information may be stored based on permissions and/or privileges associated with the operating system.

The application traffic information may include information identifying the applications (e.g., identifiers and/or names), information identifying interfaces (e.g., for network protocol types) used by the applications, network addresses (e.g., destination Internet Protocol (IP) addresses and/or source IP addresses) associated with the application traffic, domain names associated with the applications, fully qualified domain names (FQDNs) associated with the applications, and/or port numbers used by the applications. The application traffic information may correspond to network traffic statistics associated with the applications. In some implementations, the application traffic information may be generated based on an analysis of packets included in the application traffic.

As shown in FIG. 1A, and by reference number 125, UE 105 may create, based on the application traffic, a dataset identifying applications, package names (e.g., domain names associated with the applications and/or domain names associated with application servers that serve network traffic for the applications), network protocol types, FQDNs, port numbers, and/or other information regarding the applications. For example, UE 105 may generate (or create) the dataset based on monitoring the application traffic received by and transmitted by UE 105 based on utilizing the applications.

In some implementations, UE 105 may generate the dataset based on the application traffic information. For example, the application traffic information may be accessed (e.g., in the directory) and used to generate the dataset. In some implementations, UE 105 may access the application traffic information (e.g., in the directory) using a system level application (e.g., an application on a level of the operating system). In some examples, the directory may serve as a real-time interface (or near real-time interface) to a TCP socket table and to a UDP socket table in a kernel space of the operating system (e.g., with each table being dedicated to Internet traffic associated with Internet Protocol version 4 (IPv4) and Internet Protocol version 6 (IPv6)).

UE 105 may obtain information identifying the applications (e.g., identifiers of the applications and/or names of the applications) and may access the application traffic information using the information identifying the applications.

UE 105 may access the application traffic information and generate the dataset on a periodic basis (e.g., every day, every week, every other week, and/or a similar periodic interval). Additionally, or alternatively, UE 105 may access the application traffic information based on a triggering event.

The dataset may include information regarding the applications. Information regarding an application may include information identifying an application type, information identifying the application (e.g., an identifier and/or a name), a package name associated with the application (e.g., information regarding a domain name associated with the application and/or an application server that serves network traffic for the application), information identifying a network protocol type used by the application, an FQDN associated with the application, a port number used by the application, and/or a network address associated with application traffic of the application.

In some implementations, when generating the dataset, UE 105 may organize the application traffic information. For example, UE 105 may organize the application traffic information based on application type. For example, the dataset may include a first group of applications of a first application type, a second group of applications of a second application type, and so on. Additionally, or alternatively, UE 105 may organize the information regarding application traffic based on network protocol type and/or based on another criteria that may enable network device 115 to process the dataset to allocate the application traffic to appropriate network slices. By organizing the application traffic information, UE 105 may conserve processing resources of network device 115 used to process the dataset. Additional details regarding an example dataset are described below in connection with FIG. 1B.

As shown in FIG. 1A, and by reference number 130, UE 105 may provide the dataset to a network device of the core network (e.g., at periodic intervals and/or based on a triggering event). For example, after generating the dataset, UE 105 may provide the dataset to network device 115 at periodic intervals. Additionally, or alternatively, UE 105 may provide the dataset to network device 115 based on a triggering event such as a request received from another device and/or some condition being satisfied (e.g., UE 105 may transmit the dataset when the dataset satisfies a threshold amount of memory of UE 105 and may then delete the dataset to free up memory of UE 105). In some implementations, the dataset provided to network device 115 may include historical network usage data associated with the applications. In some implementations, UE 105 may provide the dataset along with the application traffic to network device 115.

FIG. 1B shows an example of a dataset generated by UE 105 and provided to network device 115. As shown in FIG. 1B, the dataset may include information identifying an application type (e.g., category), information identifying an application name, a package name, a protocol type, a port number, and/or other information regarding the application traffic such as network addresses (e.g., destination Internet Protocol (IP) addresses and/or source IP addresses) associated with the application traffic. As shown in FIG. 1B, the dataset may be organized based on application type. For example, the dataset may include information organized for a group of gaming applications, a group of video streaming applications, a group of social media applications, a group of augmented reality/virtual reality applications, a group of educational applications, and/or a group of communications applications.

As an example, information for the group of gaming applications may include information that identifies a first gaming application (shown as "Game1"), information that identifies a first package name associated with the first gaming application (shown as "com.game1.abc"), information that identifies a first network protocol type utilized by the first gaming application (shown as "UDP"), and information that identifies a port utilized by the first gaming application (shown as "23069"). By organizing the dataset, UE 105 may conserve processing resources of network device 115 used to process the dataset.

As shown in FIG. 1C, and by reference number 135, network device 115 may segregate the dataset based on the network protocol types. In some implementations, network device 115 may receive the dataset from UE 105 and receive one or more datasets from one or more other UEs 105. Network device 115 may receive the one or more datasets in a manner similar to the manner in which the dataset is received from UE 105, as described above.

The one or more datasets may be similar to the dataset received from UE 105 and may include crowdsourced data identifying one or more of other applications utilized by the one or more other UEs 105, other network protocol types associated with the other applications, or other network addresses associated with the other applications. Network device 115 may combine the dataset (e.g., received from UE 105) and the one or more datasets (e.g., received from the one or more other UEs 105) into a combined dataset and segregate the combined dataset based on the network protocol types.

The information included in the combined dataset may be collected (e.g., by UE 105 and the one or more other UEs 105) subject to consent of users (of UE 105 and the one or more other UE 105) to such activity, for example, through well known "opt-in" or "opt-out" processes as can be appropriate. Such information may be collected in an anonymous manner. Additionally, or alternatively, such information may be collected with respect to an international mobile equipment identity (IMEI) of UE 105 and one or more IMEIs of the one or more other UEs 105. In this regard, the combined dataset may include anonymized historical network usage data.

Network device 115 may analyze the combined dataset and, based on analyzing the combined dataset, may segregate the combined dataset based on the network protocol types. For example, network device 115 may analyze the combined dataset to identify information regarding the network protocol types (e.g., discussed above). For instance, based on analyzing the combined data, network device 115 may identify information regarding the network protocol types. The information regarding a network protocol type may include information identifying the network protocol type (e.g., name, identifier, and/or another identifier of the network protocol type) and/or one or more port numbers utilized by the network protocol type.

Network device 115 may identify a first portion of the combined dataset that includes the information regarding a first network protocol type (e.g., TCP) of the network protocol types. Network device 115 may identify a second portion of the combined dataset that includes the information regarding a second network protocol type (e.g., UDP) of the network protocol types. Network device 115 may identify a third portion of the combined dataset that includes the information regarding a third network protocol type (e.g., QUIC) of the network protocol types, and so on.

For example, the first portion of the combined dataset may include information regarding one or more first applications that use the first network protocol type. The second portion of the combined dataset may include information regarding one or more second applications that use the second network protocol type, and so on.

As shown in FIG. 1C, and by reference number 140, network device 115 may identify applications utilizing the first network protocol type and the second network protocol type at the same time. For example, based on analyzing the application traffic and/or the combined dataset, network device 115 may identify information regarding applications that includes the information regarding the first network protocol type and the information regarding the second network protocol type. For instance, network device 115 may perform packet processing on packets included in the application traffic. As an example, network device 115 may perform packet processing to determine timestamps of the packets and information identifying the network protocol types associated with the packets. Additionally, or alternatively, based on analyzing the combined dataset, network device 115 may identify information regarding applications that are included in the first portion of the combined dataset and in the second portion of the combined dataset.

In this regard, based on analyzing the application traffic and/or the combined dataset, network device 115 may determine that the information regarding such applications (hereinafter referred to as "multiprotocol applications") indicates that the application traffic, of the multiprotocol applications, is transmitted using the first network protocol type and/or the second network protocol type. For example, network device 115 may determine that application traffic, of a multiprotocol application, is transmitted using the first network protocol type and the second network protocol type, concurrently or within a same period of time, to a same destination IP address. In some implementations, the network device 115 may take a first action regarding first application traffic, of the multiprotocol application, transmitted using the first network protocol type (e.g., process the first application traffic in a first manner) and take a second action regarding second application traffic, of the multiprotocol application, transmitted using the second network protocol type (e.g., process the second application traffic in a second manner different than the first manner).

Figure 1D:
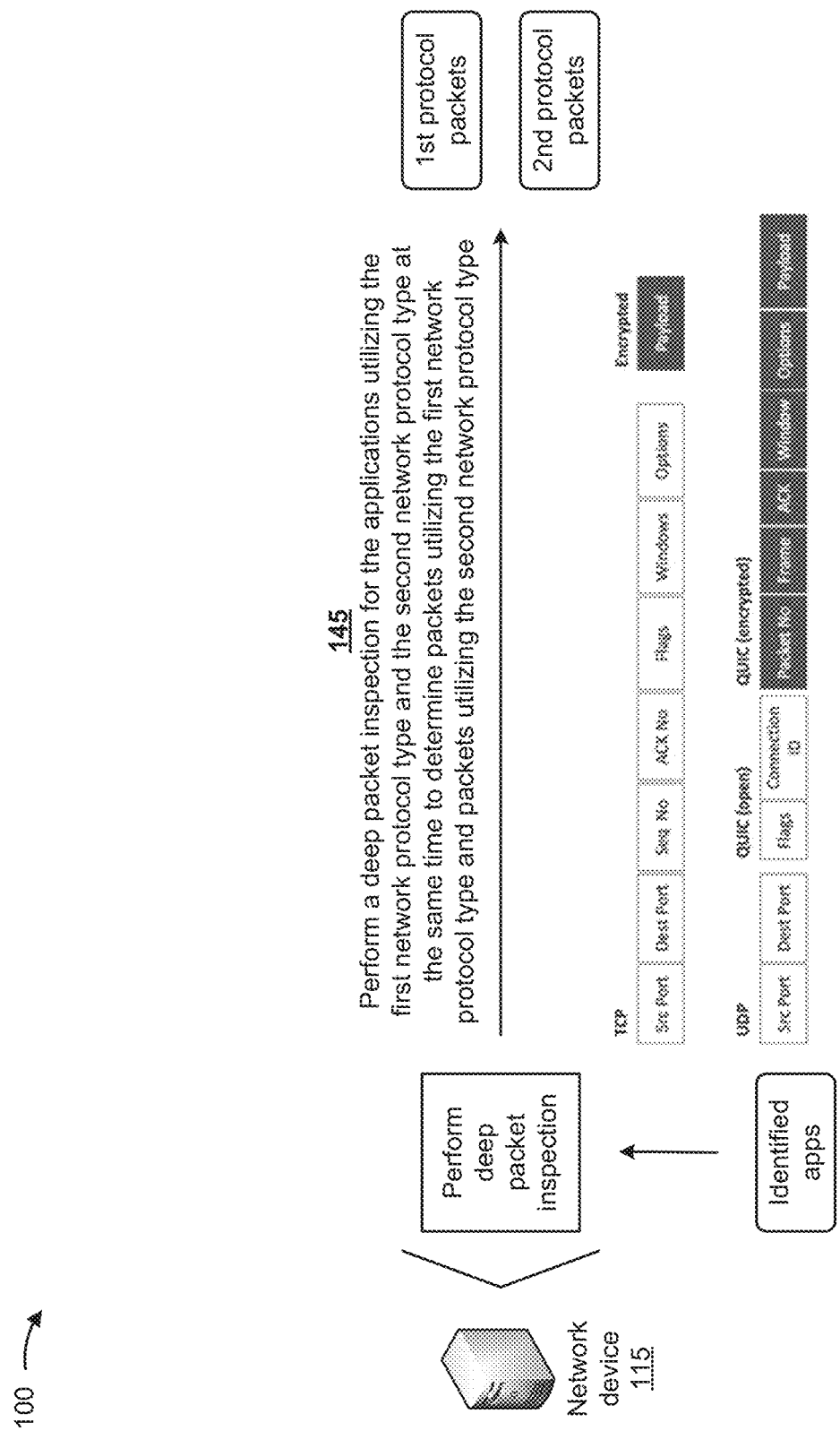

As shown in FIG. 1D, and by reference number 145, network device 115 may perform a deep packet inspection for the applications utilizing the first network protocol type and the second network protocol type at the same time to determine packets utilizing the first network protocol type and packets utilizing the second network protocol type. In some implementations, based on identifying the multiprotocol applications, network device 115 may monitor the application traffic received from UE 105 (and/or transmitted to UE 105) to identify a portion of the application traffic associated with the multiprotocol applications.

Network device 115 may identify IP descriptors of the multiprotocol applications based on the combined dataset. The IP descriptors may include information identifying the multiprotocol applications, network addresses (e.g., destination IP addresses) associated with the application traffic of the multiprotocol applications, and/or port numbers used by the multiprotocol applications. Network device 115 may identify the portion of the application traffic (associated with the multiprotocol applications) based on the IP descriptors.

Network device 115 may perform a deep packet inspection of packets included in the portion of the application traffic. For example, network device 115 may perform deep packet inspection on the packets to analyze format and/or content of the packets. Based on analyzing the format and/or the content of the packets, network device 115 may identify packets that utilize the first network protocol type and identify packets utilizing the second network protocol type.

In some implementations, based on identifying the packets utilizing the first network protocol type and the packets utilizing the second network protocol type, network device 115 may determine a network protocol type for a corresponding multiprotocol application. For example, network device 115 may determine that a multiprotocol application utilizes the first network protocol type if the application traffic (of the multiprotocol application) includes the packets that utilize the first network protocol type. Additionally, or alternatively, network device 115 may determine that the multiprotocol application utilizes the second network protocol type if the application traffic (of the multiprotocol application) includes the packets that utilize the second network protocol type. In some examples, network device 115 may include information regarding the multiprotocol application in a respective portion of the segregated dataset, based on determining the network protocol type for the multiprotocol application.

Figure 1E:
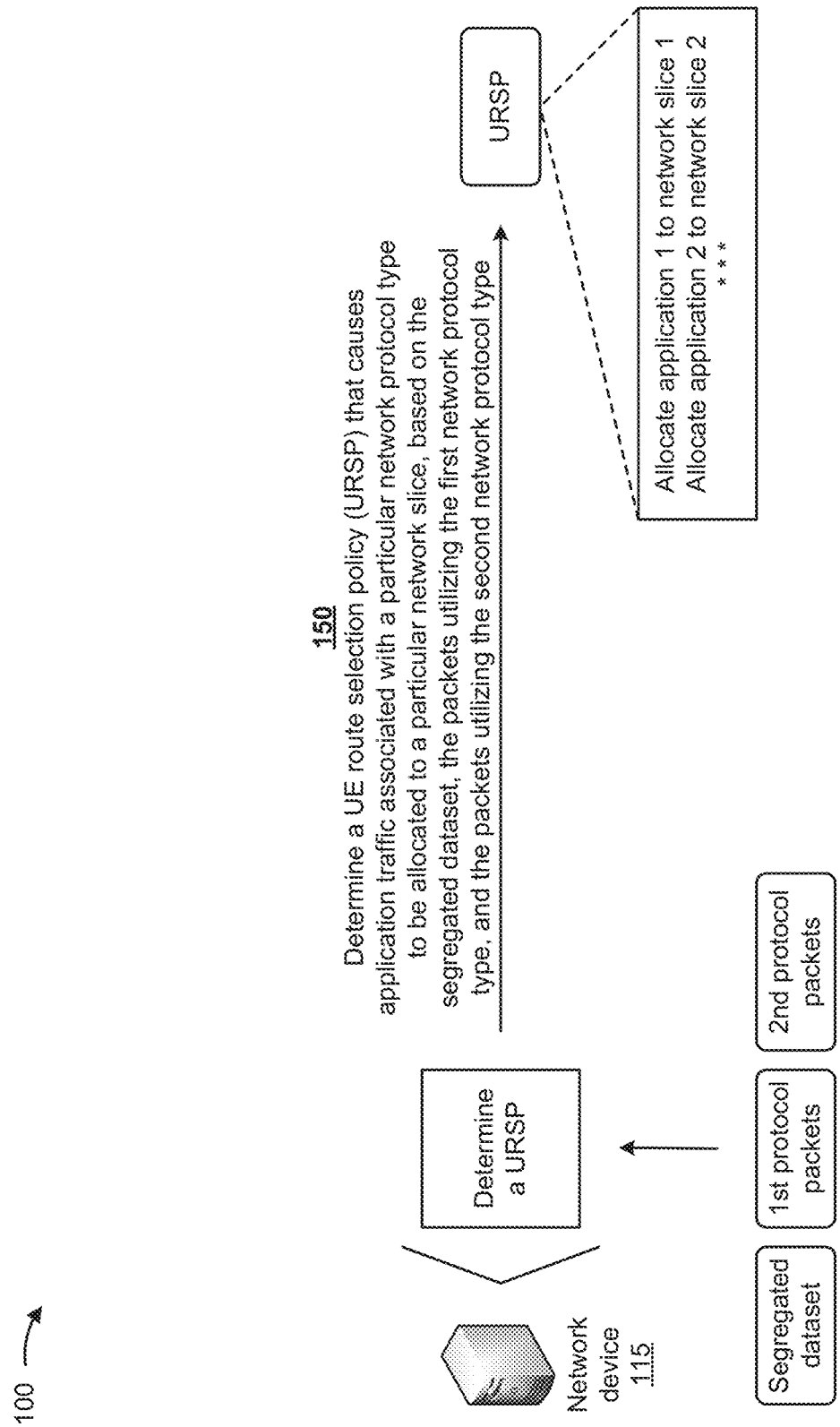

As shown in FIG. 1E, and by reference number 150, network device 115 may determine a UE route selection policy (URSP) that causes application traffic associated with a particular network protocol type to be allocated to a particular network slice, based on the segregated dataset, the packets utilizing the first network protocol type, and the packets utilizing the second network protocol type. Network device 115 may determine a URSP based on the network protocol types (e.g., described above in connection with FIGS. 1C and 1D).

For example, network device 115 may determine a URSP for a single application. For instance, network device 115 may determine a first URSP for a first application, a second URSP for a second application, and so on. Additionally, or alternatively, network device 115 may determine a URSP for a group of applications. For instance, network device 115 may determine a third URSP for a first group of applications, a fourth URSP for a second group of applications, and so on.

In some implementations, when determining a URSP, network device 115 may map application traffic (of one or more applications) to a network slice based on a network protocol type utilized by the application traffic. In other words, network device 115 may identify a network slice based on a network protocol type (e.g., based on one or more characteristics of the network protocol type). The one or more characteristics may include a transmission rate of the network protocol type, an amount of bandwidth utilized by the network protocol type, network security functions associated with the network protocol type (e.g., packet processing functions), and/or another characteristic of the network protocol type.

In this regard, network device 115 may identify a network slice with sufficient allocated resources to handle application traffic that utilize the network protocol type. The network slice may be optimized for handling the application traffic. Additionally, or alternatively, the allocated resources of the network slice (e.g., one or more network devices) may enforce packet processing based on the network protocol type.

Network device 115 may allocate the network slice for application traffic based on the network protocol type utilized by the application traffic. For example, network device 115 may allocate a first network slice for first application traffic (of one or more first applications) that utilizes the first network protocol type, allocate a second network slice for second application traffic (of one or more second applications) that utilizes the second network protocol type, allocate a third network slice for third application traffic (of one or more third applications) that utilizes the third network protocol type, and so on. The first network slice may correspond to the single network slice currently allocated for the application traffic of the applications of UE 105. The second network slice and the third network slice may be different than the single network slice.

Network device 115 may determine the URSP based on mapping the application traffic to the network slices. The URSP may include information that causes the modem or another component of UE 105 to transmit the application traffic via the network slice. In some implementations, the URSP may include a plurality of rules that causes the modem or other component of UE 105 to transmit the application traffic via the network slices (e.g., a first rule that causes the modem to transmit the first application traffic via the first network slice, a second rule that causes the modem to transmit the second application traffic via the second network slice, a third rule that causes the modem to transmit the third application traffic via the third network slice, and so on).

A rule, of the plurality of rules, may include a rule precedence value indicating a priority of the rule within the URSP (e.g., a priority of the rule with respect to one or more other rules included in the URSP). Additionally, or alternatively, the rule may include a traffic descriptor indicating when the rule is applicable. Additionally, or alternatively, the rule may include a route selection descriptor indicating one or more of a session and service continuity mode, a network slice selection, a data network name selection, a packet data unit (PDU) session type selection, a PDU session type, a non-seamless offload indication, or an access type preference. The network slice selection may include a network slice selection assistance information (NSSAI) or a single NSSAI that identifies the network slice.

Additionally, or alternatively, the rule may include an IP descriptor regarding the network protocol type, as described above. Additionally, or alternatively, the rule may include information identifying the one or more applications (e.g., one or more identifiers and/or one or more names).

Figure 1F:
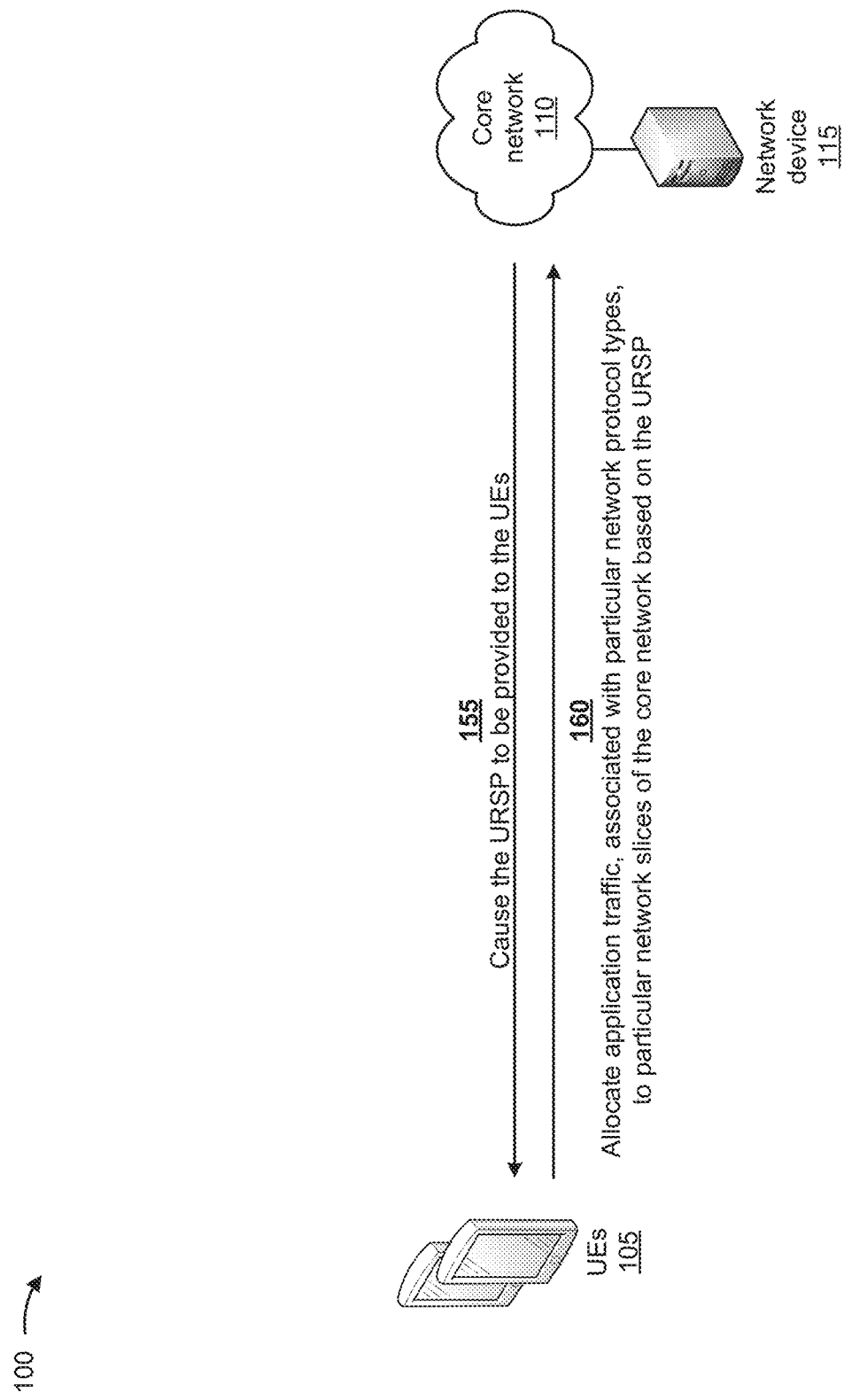

As shown in FIG. 1F, and by reference number 155, network device 115 may cause the URSP to be provided to the UEs. For example, network device 115 may cause the URSP to be provided to UE 105 (and/or to one or more other UEs 105) to enable UE 105 (e.g., the modem of UE 105) to determine a manner in which to route application traffic of the applications of UE 105. For example, the modem may use the URSP to route application traffic to a network slice corresponding to a network protocol type utilized by the application traffic.

In some implementations, when causing the URSP to be provided to UE 105, network device 115 may provide the URSP to another network device that provides URSPs to UEs. For example, network device 115 may provide the URSP to a policy control function (PCF) of core network 110 and the PCF may provide the URSP to UEs. For instance, the PCF may provide the URSP to UEs via a non-access stratum (NAS) configuration update command or via an NAS manage user equipment policy command. In some implementations, the PCF may provide the URSP based on one or more triggers (e.g., during a registration of UE 105 to core network 110, based on one or more changes to core network 110, based on one or more changes to a subscription of UE 105, and/or another similar trigger).

In some examples, network device 115 may receive an updated dataset from UE 105 on a periodic basis (e.g., as described above). Network device 115 may update the URSP based on the updated dataset and may cause the updated URSP to be provided to UE 105, in a manner similar to the manner described above. UE 105 may store the URSP and any updates to the URSP in a memory associated with UE 105. In some implementations, UE 105 may store the URSP and any updates to the URSP in the modem of UE 105.

As shown in FIG. 1F, and by reference number 160, UE 105 may allocate application traffic, associated with particular network protocol types, to particular network slices of the core network based on the URSP. For example, based on the URSP, the modem may transmit the first application traffic via the first network slice, transmit the second application traffic via the second network slice, transmit the third application traffic via the third network slice, and so on.

As an example, assume that a particular application utilizing the third network protocol type is to transmit particular application traffic to core network 110. The operating system may receive, from the particular application, the particular traffic and a request to transmit the particular application traffic. In some implementations, the request may include information identifying the particular application and information identifying the third protocol type. Based on the request, the operating system may obtain (e.g., from the particular application) an IP descriptor associated with the particular application (e.g., information identifying the third network protocol type, the port number utilized by the third network protocol type, and a destination address associated with the particular application traffic).

The operating system may provide, to the modem, the IP descriptor and the particular application traffic. The modem may access the URSP and identify a rule (of the URSP) corresponding the IP descriptor. The rule may include information identifying the third network slice allocated for application traffic utilizing the third network protocol. The modem may cause the particular application traffic to be transmitted via the third network slice. If the modem is unable to identify a rule corresponding to the IP descriptor, the modem may identify a default network slice and cause the particular application traffic to be transmitted using the default network slice.

The number and arrangement of devices and networks shown in FIGS. 1A-1F are provided as an example. In practice, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) of example implementation 100 may perform one or more functions described as being performed by another set of devices of example implementation 100.

Figure 2:
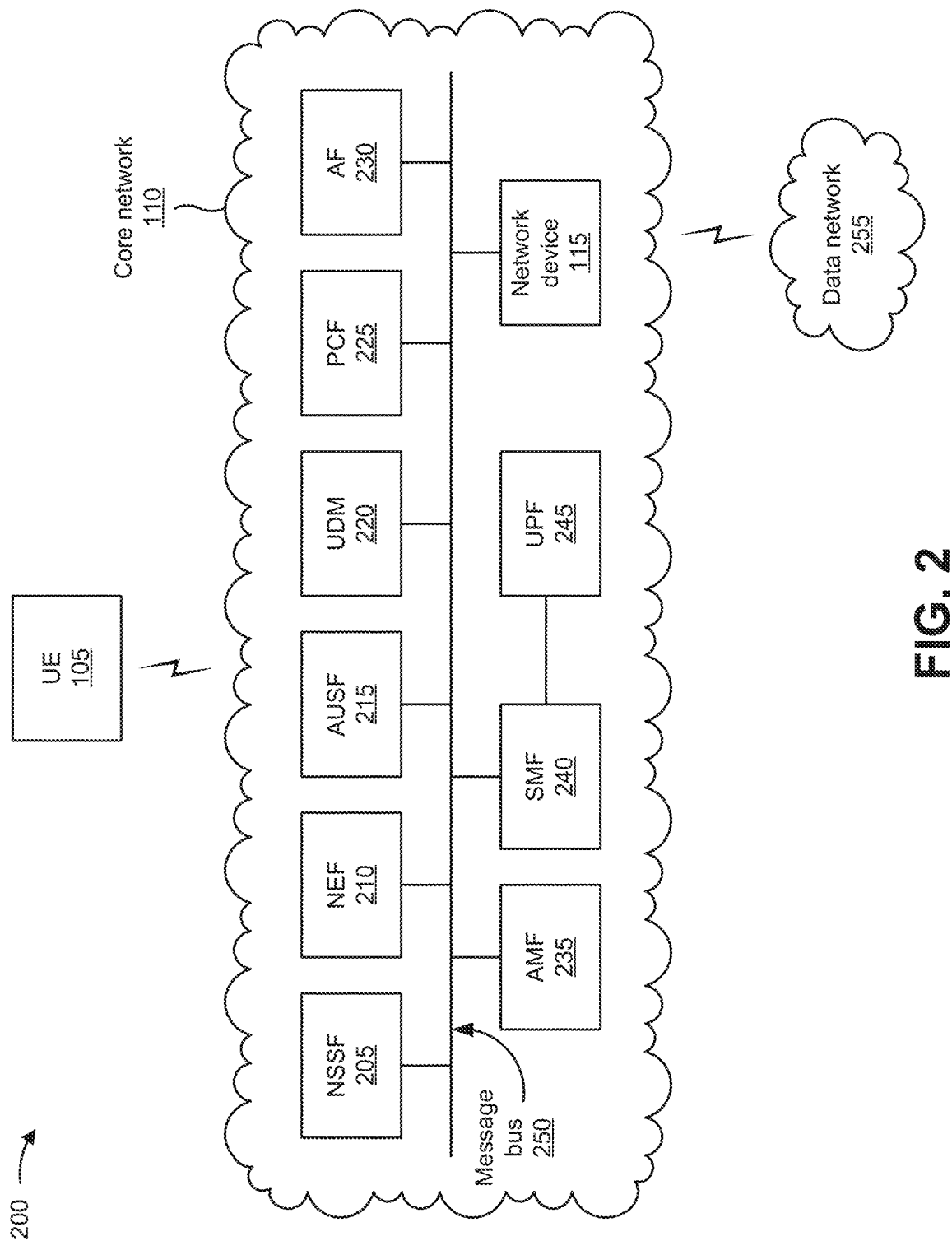
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include UE 105, core network 110, and a data network 255. Devices and/or networks of example environment 200 may interconnect via wired connections, wireless connections, or a combination of wired and wireless connections.

UE 105 includes one or more devices capable of receiving, generating, storing, processing, and/or providing information, such as information described herein. For example, UE 105 can include a mobile phone (e.g., a smart phone, a radiotelephone, and/or other similar devices), a laptop computer, a tablet computer, a desktop computer, a handheld computer, a gaming device, a wearable communication device (e.g., a smart watch, a pair of smart glasses, and/or other similar devices), a mobile hotspot device, a fixed wireless access device, customer premises equipment, an autonomous vehicle, or a similar type of device.

In some implementations, core network 110 may include an example functional architecture in which systems and/or methods described herein may be implemented. For example, core network 110 may include an example architecture of a fifth generation (5G) next generation (NG) core network included in a 5G wireless telecommunications system. While the example architecture of core network 110 shown in FIG. 2 may be an example of a service-based architecture, in some implementations, core network 110 may be implemented as a reference-point architecture, and/or a 4G core network.

Network device 115 may include one or more devices associated with a core network and/or a radio access network. For example, network device 115 may include a server, an application server, an application function (AF) entity, an access and mobility management function (AMF) entity, an authentication server function (AUSF) entity, a policy control function (PCF) entity, and/or a base station.

As shown in FIG. 2, core network 110 may include a number of functional elements. The functional elements may include, for example, a network slice selection function (NSSF) 205, a network exposure function (NEF) 210, an authentication server function (AUSF) 215, a unified data management (UDM) component 220, a policy control function (PCF) 225, an application function (AF) 230, an access and mobility management function (AMF) 235, a session management function (SMF) 240, and/or a user plane function (UPF) 245. These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

NSSF 205 includes one or more devices that select network slice instances for UE 105. By providing network slicing, NSSF 205 allows an operator to deploy multiple substantially independent end-to-end networks potentially with the same infrastructure. In some implementations, each slice may be customized for different services.

NEF 210 includes one or more devices that support exposure of capabilities and/or events in the wireless telecommunications system to help other entities in the wireless telecommunications system discover network services.

AUSF 215 includes one or more devices that act as an authentication server and support the process of authenticating UE 105 in the wireless telecommunications system.

UDM 220 includes one or more devices that store user data and profiles in the wireless telecommunications system. UDM 220 may be used for fixed access, and/or mobile access, in core network 110.

PCF 225 includes one or more devices that provide a policy framework that incorporates network slicing, roaming, packet processing, and/or mobility management.

AF 230 includes one or more devices that support application influence on traffic routing, access to NEF 210, and/or policy control.

AMF 235 includes one or more devices that act as a termination point for non-access stratum (NAS) signaling, and/or mobility management.

SMF 240 includes one or more devices that support the establishment, modification, and release of communication sessions in the wireless telecommunications system. For example, SMF 240 may configure traffic steering policies at UPF 245, and/or enforce user equipment IP address allocation and policies.

UPF 245 includes one or more devices that serve as an anchor point for intra cellular radio access technology (RAT) and/or interRAT mobility. UPF 245 may apply rules to packets, such as rules pertaining to packet routing, traffic reporting, and/or handling user plane QoS.

Message bus 250 represents a communication structure for communication among the functional elements. In other words, message bus 250 may permit communication between two or more functional elements.

Data network 255 includes one or more wired and/or wireless data networks. For example, data network 255 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a similar network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
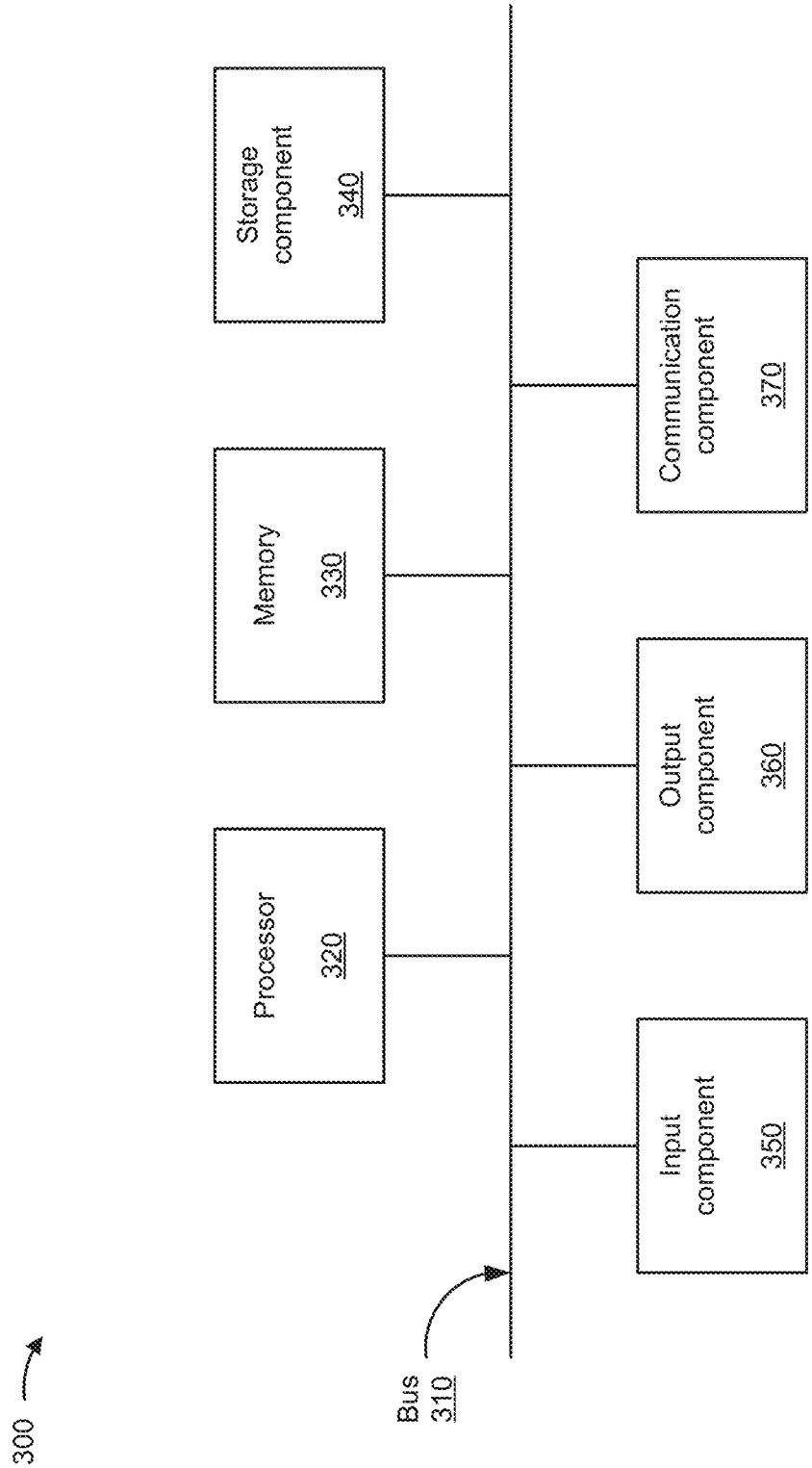
FIG. 3 is a diagram of example components of one or more devices of FIG. 2.

FIG. 3 is a diagram of example components of a device 300, which may correspond to UE 105 and/or network device 115. In some implementations, UE 105 and/or network device 115 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, program code, and/or similar instructions) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
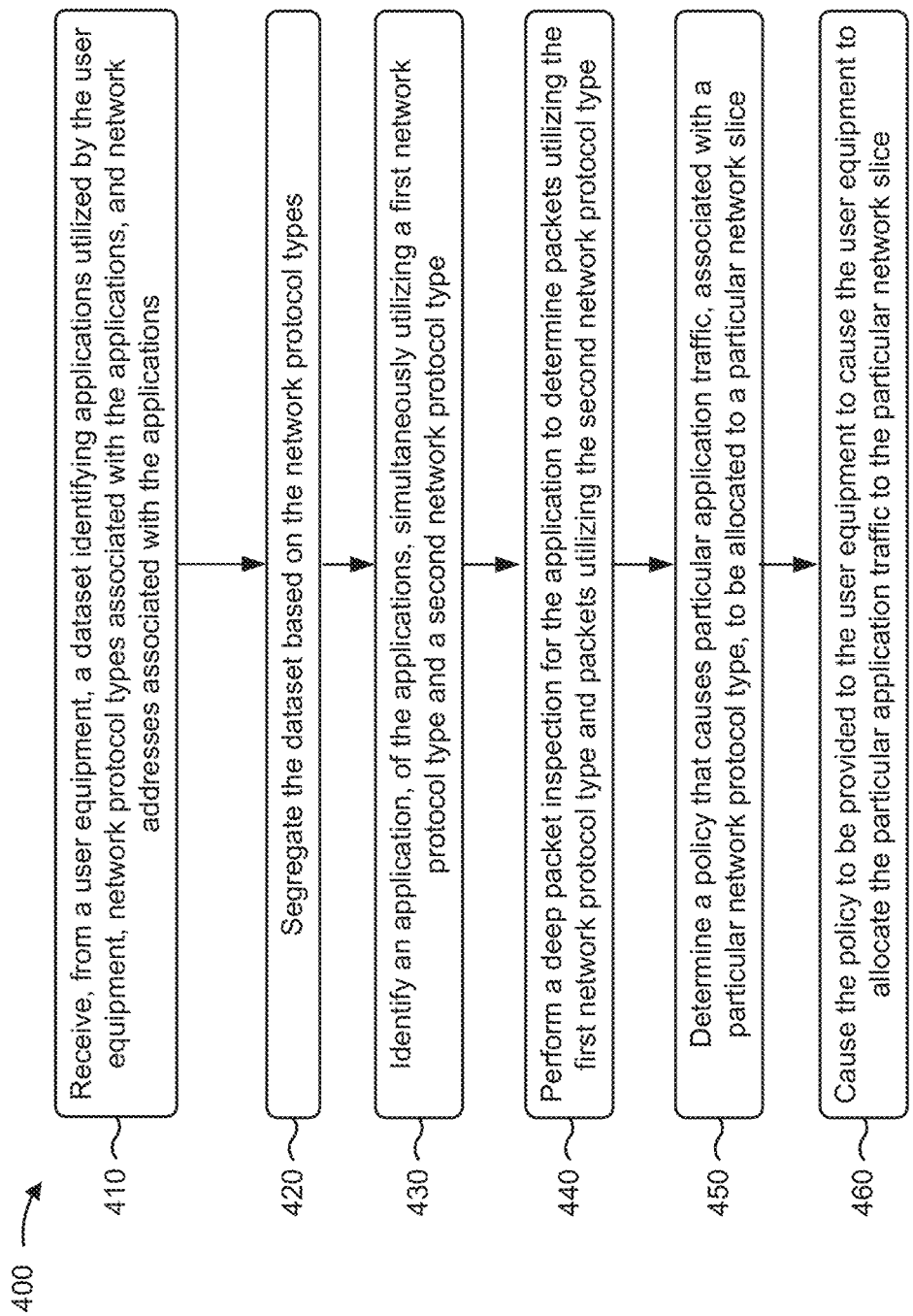
FIG. 4 is a flowchart of an example process associated with determining a policy that allocates traffic associated with a network protocol type to a network slice.

FIG. 4 is a flowchart of an example process 400 associated with determining a policy that allocates traffic associated with a network protocol type to a network slice. In some implementations, one or more process blocks of FIG. 4 may be performed by a network device (e.g., network device 115). In some implementations, one or more process blocks of FIG. 4 may be performed by another device or a group of devices separate from or including the network device, such as UE (e.g., UE 105). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving, from a user equipment, a dataset identifying: applications utilized by the user equipment, network protocol types associated with the applications, and network addresses associated with the applications (block 410). For example, the network device may receive, from a user equipment, a dataset identifying: applications utilized by the user equipment, network protocol types associated with the applications, and network addresses associated with the applications, as described above. In some implementations, the dataset is generated by the user equipment based on the user equipment monitoring application traffic transmitted from and received by the user equipment. In some implementations, the network protocol types include one or more of a transmission control protocol, a user datagram protocol (UDP), a quick UDP Internet connections protocol, a hypertext transfer protocol, or a file transfer protocol. In some implementations, the applications utilized by the user equipment include one or more of one or more gaming applications, one or more video streaming applications, one or more social media applications, one or more augmented reality applications, one or more virtual reality applications, one or more educational applications, or one or more communications applications.

As further shown in FIG. 4, process 400 may include segregating the dataset based on the network protocol types and to generate a segregated dataset (block 420). For example, the network device may segregate the dataset based on the network protocol types and to generate a segregated dataset, as described above.

As further shown in FIG. 4, process 400 may include identifying an application, of the applications, simultaneously utilizing a first network protocol type and a second network protocol type (block 430). For example, the network device may identify an application, of the applications, simultaneously utilizing a first network protocol type and a second network protocol type, as described above.

As further shown in FIG. 4, process 400 may include performing a deep packet inspection for the application, simultaneously utilizing the first network protocol type and the second network protocol type, to determine packets utilizing the first network protocol type and packets utilizing the second network protocol type (block 440). For example, the network device may perform a deep packet inspection for the application, simultaneously utilizing the first network protocol type and the second network protocol type, to determine packets utilizing the first network protocol type and packets utilizing the second network protocol type, as described above.

As further shown in FIG. 4, process 400 may include determining, based on the segregated dataset, the packets utilizing the first network protocol type, and the packets utilizing the second network protocol type, a policy that causes particular application traffic associated with a particular network protocol type to be allocated to a particular network slice of the network (block 450). For example, the network device may determine, based on the segregated dataset, the packets utilizing the first network protocol type, and the packets utilizing the second network protocol type, a policy that causes particular application traffic associated with a particular network protocol type to be allocated to a particular network slice of the network, as described above. In some implementations, the policy includes a user equipment route selection policy. In some implementations, determining the policy that causes the particular application traffic associated with the particular network protocol type to be allocated to the particular network slice of the network comprises mapping the particular application traffic to the particular network slice based on the particular network protocol type, and determining the policy based on mapping the particular application traffic to the particular network slice.

As further shown in FIG. 4, process 400 may include causing the policy to be provided to the user equipment to cause the user equipment to allocate the particular application traffic associated with the particular network protocol type to the particular network slice of the network (block 460). For example, the network device may cause the policy to be provided to the user equipment to cause the user equipment to allocate the particular application traffic associated with the particular network protocol type to the particular network slice of the network, as described above. In some implementations, process 400 includes receiving an updated dataset from the user equipment after a predetermined time period, updating the policy based on the updated dataset, and causing the updated policy to be provided to the user equipment.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   identifying, by a network device, an application, of a dataset identifying applications utilized by a user equipment, simultaneously utilizing both a first network protocol type, of network protocol types, and a second network protocol type of the network protocol types, based on analyzing the dataset,
      wherein the dataset includes a segregated dataset based on segregating, by the network device and based on the network protocol types, a combined dataset formed by the network device that includes anonymized historical network usage data crowdsourced from one or more other user equipments identifying one or more other applications utilized by the one or more other user equipments;
   performing, by the network device, a deep packet inspection for the application, simultaneously utilizing the first network protocol type and the second network protocol type, to determine packets utilizing the first network protocol type and packets utilizing the second network protocol type; and
   determining, by the network device a route selection policy based on the dataset, the packets utilizing the first network protocol type, and the packets utilizing the second network protocol type.

2. The method of claim 1, wherein the dataset is-a comprises one or more datasets.

3. The method of claim 1, wherein the dataset includes one or more of:
   other anonymized historical network usage data, or
   information collected subject to consent of one or more users.

4. The method of claim 1, wherein performing the deep packet inspection for the application comprises:
   performing packet processing to determine timestamps of packets included in application traffic.

5. The method of claim 1, wherein performing the deep packet inspection for the application comprises:
   determining that information regarding multiprotocol applications indicates that application traffic, of the multiprotocol applications, is transmitted using the first network protocol type or the second network protocol type.

6. The method of claim 1, wherein performing the deep packet inspection for the application comprises:
   determining that application traffic, of a multiprotocol application is transmitted using the first network protocol type and the second network protocol type, concurrently or within a same period of time, to a same destination Internet Protocol (IP) address.

7. The method of claim 1, wherein identifying the applications comprises:
   identifying information regarding the applications that are included in a first portion of the combined dataset and in a second portion of the combined dataset.

8. A non-transitory computer-readable medium storing a set of instructions, the set of instructions comprising:

one or more instructions that, when executed by one or more processors of a network device, cause the network device to:
  identify an application, of a dataset identifying applications utilized by a user equipment, simultaneously utilizing a first network protocol type, of network protocol types, and a second network protocol type of the network protocol types, based on analyzing the dataset,
    wherein the dataset includes a segregated dataset based on segregating, by the network device and based on the network protocol types, a combined dataset formed by the network device that includes anonymized historical network usage data crowdsourced from one or more other user equipments identifying one or more other applications utilized by the one or more other user equipments;
  perform a deep packet inspection for the application, simultaneously utilizing the first network protocol type and the second network protocol type, to determine packets utilizing the first network protocol type and packets utilizing the second network protocol type; and
  determine, based on the segregated dataset, the packets utilizing the first network protocol type, and the packets utilizing the second network protocol type, a route selection policy.

9. The non-transitory computer-readable medium of claim 8, wherein the network protocol types include one or more of:
  a transmission control protocol,
  a user datagram protocol (UDP),
  a quick UDP Internet connections protocol,
  a hypertext transfer protocol, or
  a file transfer protocol.

10. The non-transitory computer-readable medium of claim 8, wherein the dataset further includes one or more of:
  information identifying an application type,
  information identifying an identifier or name of the application,
  a package name associated with the application,
  a domain name associated with the application,
  a port number used by the application, or
  a network address associated with application traffic of the application.

11. The non-transitory computer-readable medium of claim 8, wherein the one or more instructions further cause the network device to:
  determine another policy for another application of the applications.

12. The non-transitory computer-readable medium of claim 8, wherein the one or more instructions, that cause the network device to perform the deep packet inspection for the application, cause the network device to:
  determine that information regarding multiprotocol applications indicates that application traffic, of the multiprotocol applications, is transmitted using the first network protocol type or the second network protocol type.

13. The non-transitory computer-readable medium of claim 8, wherein the one or more instructions, that cause the network device to perform the deep packet inspection for the application, cause the network device to:
  determine that application traffic, of a multiprotocol application is transmitted using the first network protocol type and the second network protocol type, concurrently or within a same period of time, to a same destination Internet Protocol (IP) address.

14. The non-transitory computer-readable medium of claim 8, wherein the one or more instructions that cause the network device to determine route selection policy, cause the network device to:
  map application traffic to a network slice based on a network protocol type utilized by the application traffic.

15. A network device, comprising:
  one or more processors configured to:
    identify an application, of a dataset identifying applications utilized by a user equipment, simultaneously utilizing a first network protocol type, of network protocol types, and a second network protocol type of the network protocol types, based on analyzing the dataset,
      wherein the dataset includes a segregated dataset based on segregating, by the network device and based on the network protocol types, a combined dataset formed by the network device that includes anonymized historical network usage data crowdsourced from one or more other user equipments identifying one or more other applications utilized by the one or more other user equipments;
    perform a deep packet inspection for the application, simultaneously utilizing the first network protocol type and the second network protocol type, to determine packets utilizing the first network protocol type and packets utilizing the second network protocol type; and
    determine, based on the dataset, the packets utilizing the first network protocol type, and the packets utilizing the second network protocol type, a route selection policy.

16. The network device of claim 15, wherein the route selection policy includes a plurality of rules, and wherein a rule, of the plurality of rules includes one or more of:
  a rule precedence value indicating a priority of the rule within the policy,
  a traffic descriptor indicating when the rule is applicable,
  a route selection descriptor indicating one or more of a session and service continuity mode, a network slice selection, a data network name selection, a packet data unit (PDU) session type selection, a PDU session type, a non-seamless offload indication, or an access type preference,
  an IP descriptor regarding a particular network protocol type, or
  information identifying one or more applications.

17. The network device of claim 15, wherein the one or more processors are further configured to:
  cause the route selection policy to be provided to another network device to provide the route selection policy to the user equipment.

18. The network device of claim 15, wherein the one or more processors, to perform the deep packet inspection for the application, are configured to:
  perform packet processing to determine timestamps of packets included in application traffic.

19. The network device of claim 15, wherein the one or more processors, to perform the deep packet inspection for the application, are configured to:
  determine that information regarding multiprotocol applications indicates that application traffic, of the multiprotocol applications, is transmitted using the first network protocol type or the second network protocol type.

20. The network device of claim 15, wherein the one or more processors, to perform the deep packet inspection for the application, are configured to:
  determine that application traffic, of a multiprotocol application is transmitted using the first network protocol type and the second network protocol type, concurrently or within a same period of time, to a same destination IP address.

* * * * *